United States Patent [19]

Watanabe

[11] 4,436,253
[45] Mar. 13, 1984

[54] DEVICE FOR CLAMPING ONE TERMINAL END OF A TAPE IN A TAPE REEL

[75] Inventor: Koji Watanabe, Fujisawa, Japan

[73] Assignee: NIFCO, Inc., Yokohama, Japan

[21] Appl. No.: 322,009

[22] Filed: Nov. 16, 1981

[30] Foreign Application Priority Data

Nov. 26, 1980 [JP] Japan .......................... 55-168233[U]

[51] Int. Cl.³ ............................................. B65H 75/28
[52] U.S. Cl. ..................................... 242/74.1; 242/74
[58] Field of Search ............. 24/243 R, 201 C, 201 A, 24/213 R, 214, 220; 242/74, 74.1

[56] References Cited

U.S. PATENT DOCUMENTS

| 3,990,733 | 11/1976 | Shiba et al. | 242/74 |
| 4,290,562 | 9/1981 | Sasaki et al. | 242/74 |
| 4,300,729 | 11/1981 | Oishi et al. | 242/74.1 |
| 4,360,173 | 11/1982 | Shoji | 242/74 |

Primary Examiner—Paul J. Hirsch
Attorney, Agent, or Firm—Schwartz & Weinrieb

[57] ABSTRACT

Disclosed is a device for clamping a terminal portion of a tape in a tape reel which device comprises a base, two oppositely disposed resilient legs integrally connected thereto, and a bridge integrally connected to the ends of the oppositely disposed legs, thus causing the opposing legs to yieldingly bend outward apart from each other when the bridge of the device is pushed against the bottom of the recess of the tape reel.

8 Claims, 5 Drawing Figures

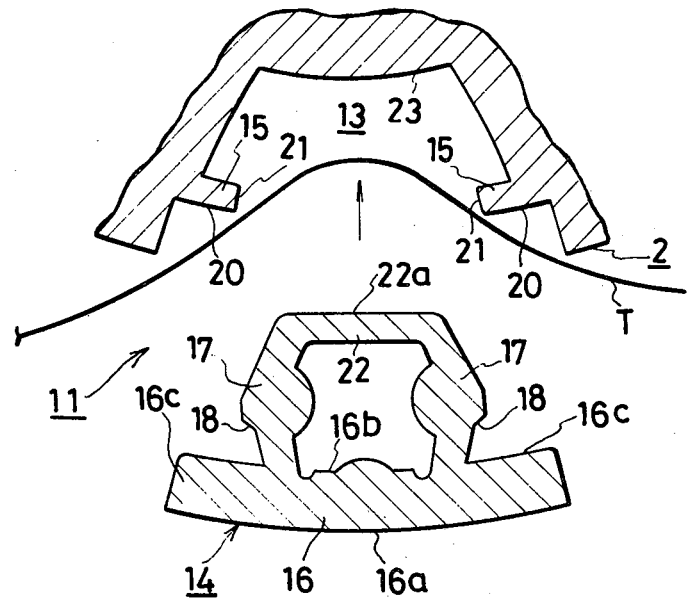
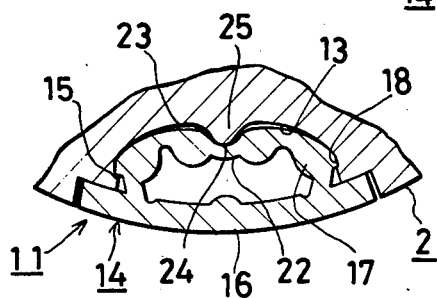
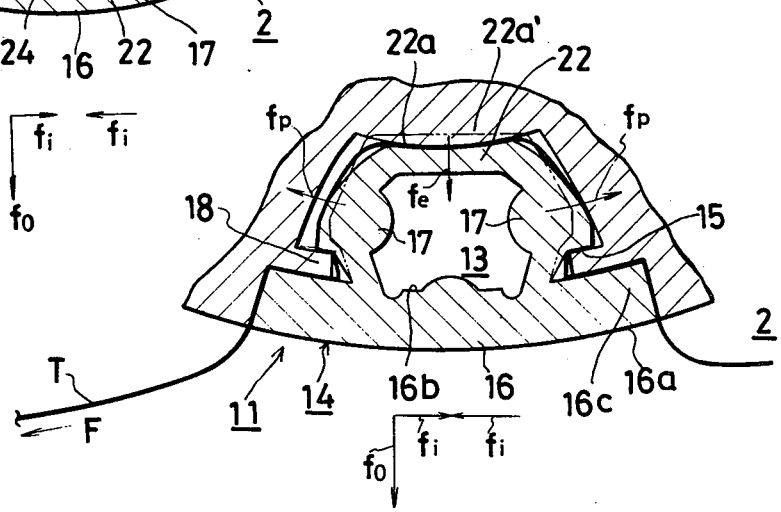

DEVICE FOR CLAMPING ONE TERMINAL END OF A TAPE IN A TAPE REEL

FIELD OF THE INVENTION

This invention relates to a device for clamping a terminal portion of an audio or video recording-tape in the hub of a tape reel.

BACKGROUND OF THE INVENTION

A variety of tape reels each equipped with a tape clamp have been hitherto proposed. In such a conventional tape reel which is well known, there is provided a relatively large recess in the hub around which a length of tape is to be wound. A terminal portion of the tape is put in the recess, and then a push insert is put in the recess, pushing the terminal end of the tape against the inner wall of the recess as, for instance, under a resilient force. There are two kinds of push inserts, one being so constructed that it is put in the recess of the hub in the axial direction of the hub, and the other being so constructed that it is put in the recess of the hub in the radial direction of the hub from the exterior.

This invention is an improvement of a device for clamping a terminal portion of a tape in the recess of the hub of a tape reel, which device is constructed so as to fit a clamp in a recess in the radial direction of the hub from the exterior.

OBJECTS OF THE INVENTION

One object of this invention is to provide a tape clamping device which is simple in structure, and is easy to handle.

Another object of this invention is to provide a tape clamping device which assures the terminal portion of the tape does not slip off from the recess of the hub when the tape is subjected to an undesired stretching force.

SUMMARY OF THE INVENTION

To attain these objects a device for clamping a terminal portion of an audio or video recording-tape in a tape reel according to this invention comprises a base and a pair of resilient legs integrally connected to and extending from the rear side of the base, the ends of these legs being integrally connected to each other by a bridge thereacross, the length of said legs being somewhat greater than the depth of a recess of the hub of the tape reel, thus causing said legs to bend yieldingly outward apart from each other and positively catching the terminal portion of the tape in cooperation with the inner wall of the recess of the hub of the tape reel.

BRIEF DESCRIPTION OF THE DRAWINGS

Other objects and advantages of this invention will be understood from the following description of preferred embodiments which are shown in the accompanying drawings:

FIG. 3 is a sectional view of one embodiment according to this invention prior to clamping the terminal portion of a tape;

FIG. 4 is a sectional view of the clamping device of FIG. 3 in the state of clamping the terminal end of a tape; and FIG. 5 is a sectional view of another embodiment according to this invention in the state of clamping the terminal end of a tape.

DESCRIPTION OF PREFERRED EMBODIMENTS

Figure 1:
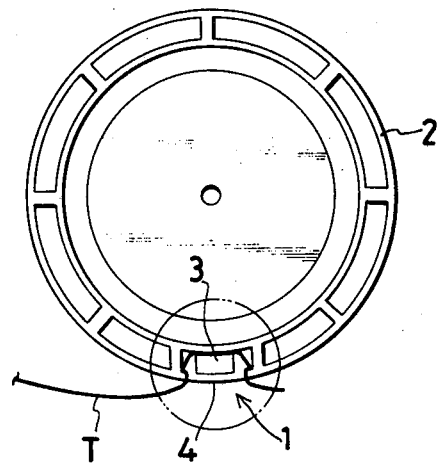
FIG. 1 shows a plan view of the hub of a tape reel required with a conventional clamp.
Figure 2:
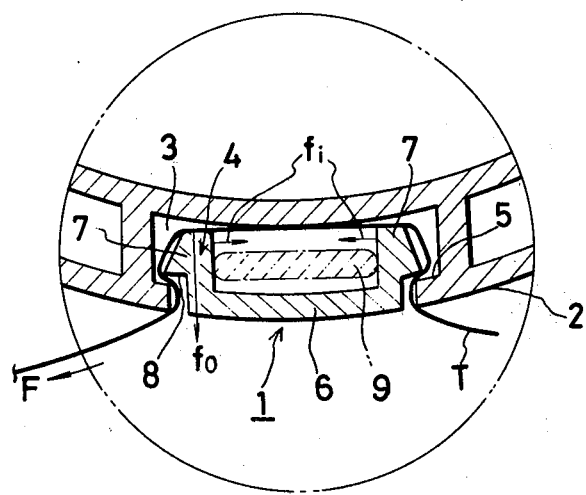
FIG. 2 is an enlarged view of the conventional clamp shown in FIG. 1.

Generally an audio or video recording-tape reel uses a tape clamping device 1 by means of which a terminal portion of the tape "T" is caught at a portion of the circumference of the hub 2 of the reel, as shown in FIG. 1. In FIG. 2 there is shown, at an enlarged scale, the clamping device 1, which is encircled by the dashed line in FIG. 1. The clamping device 1 consists of a recess 3 provided in the hub 2 of the reel, and a clamp or push insert 4 to be put in the recess 3. The recess 3 has a circumferential opening along the outer circumference of the hub 2 and a radial space coextensive with the opening. Also, the recess 3 is as thick as the hub 2. As shown, a catch extension 5 is provided on each end of the recess opening, thus forming a somewhat narrow entrance to the inner space.

The clamp 4 has a base 6, two resilient legs 7 extending from the opposite ends of the base, and bulging catches 8 integrally connected to the ends of the legs. The base 6 has the same curvature as the hub, and therefore the clamp when fitted in the recess will constitute a contiguous part along the outer circumference of the hub. The distance between the oppositely disposed bulging catches 8 is somewhat greater than the distance between the opposite catch extensions 5, that is, the width of the opening of the recess. The reel hub 2 and the clamp 4 are made of plastic.

With this arrangement, in use, a terminal portion of a tape "T" is laid in the recess 3, and then the clamp 4 is Pushed in the recess 3 with its resilient legs 7 yieldingly bent against the opposite extensions 5 of the recess opening. When the bulging catches 8 of the legs 7 have passed over the opposite extensions 5, the resilient legs 7 return to their original upstanding positions due to their resilience, putting the bulging catches 8 of the legs in engagement with the opposite extensions 5 of the recess opening. Thus, the clamp is fitted in the recess of the hub, catching the terminal end of the tape.

With this arrangement the positive catching of the terminal portion of the tape is not assured. As shown in FIG. 2, if the tape "T" is subjected to a pulling force "F", the pull generates forces "$f_i$" the effect of which is to bend the opposite legs 7 inwardly toward each other, and at the same time, the pull generates force "$f_0$" the effect of which is to pull the clamp out of the recess of the hub, thus often causing the clamp to slip off from the recess of the hub of the reel. This is because the terminal portion of the tape goes around the opposite legs of the clamp.

Increasing the extension of each bulging catch from the associated leg is effective to prevent the clamp from slipping off from the recess of the hub. This, however, requires increasing effort to push the clamp in the recess of the hub of the reel, and accordingly the efficiency at which the work of catching the tape end in the tape reel is performed, is lowered.

In the hope of preventing the clamp from slipping off from the recess of the hub while still allowing the snapping-in of the clamp in the hub recess with a light effort, it has been proposed that a wedge 9 be pushed in the space between the legs of the clamp, as indicated by the dashed lines in FIG. 2.

This remedy, however, will disadvantageously increase the number of parts, and accordingly the number of assembling steps and the cost involved therefor will increase. The use of such wedge nullifies the advantageous structure of the clamp which enables snapping in and tape catching in one operation.

A device for clamping a terminal portion of a tape in a tape reel according to this invention is guaranteed to be free of the drawbacks mentioned above. Preferred embodiments are described below with reference to FIGS. 3–5.

Referring to FIGS. 3 and 4, there is shown a first embodiment according to this invention in the state prior to clamping (FIG. 3) and in the state of clamping a terminal portion of a tape in the hub of a tape reel (FIG. 4). The clamping device 11 consists of a recess 13 provided in the hub 2 of a tape reel, and a clamp 14 to fit in the recess of the reel hub, as is the case with the conventional clamping device as shown in FIGS. 1 and 2. Likewise, the clamp 14 has a baqe 16, of which the outer surface 16a constitutes a contiguous part along the circumference of the hub reel. Two oppositely disposed resilient legs 17 are integrally connected to the rear side 16b of the base 16. Each leg 17 has a bulging catch 18, and each side wall of the recess 3 has a counter catch extension 15. In this particular embodiment notched portions 20 are provided on the inside walls of the recess 13 to allow extending flanges 16c of substantial thickness to fit in the recess with the outer surface of the base 16 on the same level as the circumference of the reel hub, and therefore the counter catch extensions are positioned at a level which is lower than that in the conventional clamping device shown in FIGS. 1 and 2.

As a matter of course, the distance between the inner sides 21 of the opposite extensions of the recess is somewhat shorter than the distance between the opposite legs 17 of the clamp to assure snapping and latching.

One of the central features of this invention resides in the integral connection of the opposite legs 17 in the form of a bridge 22, thus forming a "U"-shaped member (17-22-17) integrally connected to the back side of the base 16. The length of the legs of the "U"-shaped member, that is, the distance from the back side 16b of the base 16 to the outersurface 22a of the bridge 22 of the "U"-shaped member, is somewhat longer than the radial distance, or depth of the recess 13 for the reasons described below.

A terminal portion of a tape can be clamped in a tape reel equipped with a clamping device according to this invention in the same way as in a tape reel equipped with the conventional clamping device of FIGS. 1 and 2.

Specifically, a terminal portion of a tape "T" is laid across the recess opening, and then the clamp member 14 is Pushed in the recess 13 with its bridge portion 22 aligned in the direction of the recess 13. The legs 17 are pushed against the side faces 21 of the opposite extensions 15, and are yieldingly bent. When the bulging catches 18 come under the counter catch extensions 15, the legs 17 return to their original upstanding positions, bringing the abutment surfaces of the bulging catches 18 in contact with those of the counter catch extensions. Thus, the terminal portion of the tape "T" is clamped between the whole of the counter surfaces of the clamp 14 and recess 13, as shown in FIG. 4. As a matter of course, the clamp member 14 and the recess 13 are so fabricated that the counter portions of male and female members fit closely with each other when the clamp member is partly deformed to fit snugly in the recess. As described earlier, the length of the legs of the "U"-shaped member is greater than the depth of the recess 13, and therefore the front surface 22a of the bridge member 22 is pushed against the bottom 23 of the recess 13. Then the shape of the "U"-shaped member changes from its original shape 22a' (dashed lines) to the collapsed one under the influence of the forces "$f_e$" and "$f_p$" as shown in FIG. 4.

The legs 17 are yieldingly bent under the influence of the circumferential force component "$f_p$" thus bringing their bulging catches 18 under the catch extensions 15 deep enough to assure positive catchment of the terminal length of the tape. The resilient force with which the deformed "U"-shaped member tends to return to its original form, pushes the bulging catches against the undersurfaces 18 of the opposite catch extensions with increased force. After fitting in the recess 13 of the hub 2 the radial force component is generated against the bridge portion of the "U"-shaped member, and the opposite legs are bent outwardly to assure the positive catch-and-clamp of the terminal portion of the tape. Therefore, the distance between the undersurfaces 18 of the opposite legs 17 is determined in respect of the distance between the side faces 21 of the inner extensions so as to assure that the clamp 11 is snapped into the recess 13 with a gentle push.

Assuming that the tape "T" is stretched as indicated by "F" and that the forces "$f_i$" generated tend to bend the legs inwardly toward each other, such forces are opposed to and cancelled by each other in the length of the bridge of the "U"-shaped member. Thus, even if a pulling force component "$f_0$" is applied to the clamp, the engagement of the bulging catch surfaces 18 with the catch extensions 15 is positively maintained, resistant to the pulling force component "$f_0$". The hub and associated clamp member are made of plastic.

FIG. 5 shows a second embodiment according to this invention. As shown, there is provided a reentrant portion 24 in the bridge 22 of a "U"-shaped member, and there is provided a projection 25 in the bottom 23 of a recess 13 so that the projection may fit in the reentrant portion when the "U"-shaped member is collapsed against the bottom of the recess. The reasons for providing this reentrant portion and the projection are that additional force is generated to resist the force "$f_i$" which tends to bend the oppositely disposed legs inwardly, and therefore this arrangement is effective to strengthen the bridge portion of the "U"-shaped member if it is somewhat weak. The terminal portion of a tape (not shown) is clamped in the clamping device of FIG. 4 in the same manner as in that of FIG. 5. Then, if the tape is stretched with a force "F", the force components "$f_i$" are cancelled out in the length of the bridge portion. These components "$f_i$" apply to the opposite sides of the projection 25 to reduce the adverse effect on the opposite legs of the "U"-shaped member.

With this arrangement the stiffness of the bridge portion 22 is reduced so that the clamp may be pushed in the recess with a gentle push. The catching force is maintained because of the projection-and-reentrant system.

As many projections and reentrant portions as desired may be provided. The leg 17 consists of thick and thin portions in combination. This particular shape has been designed for rigidity, flexibility and economy.

As is apparent from the above, there is provided according to this invention, a clamping device which is capable of catching the terminal end of a tape with an increased force, not requiring a strong force to push the clamp in the recess of the hub or any extra member which is used for increasing the tape catching force after the clamp has been fitted in the recess of the hub. The legs 17 and bridge portion 22 are usually flush with the hub, but they may be at a lower level than the hub.

Obviously, many modifications and variations of the present invention are possible in light of the above teachings. It is therefore to be understood that within the scope of the appended claims, the present invention may be practiced otherwise than as specifically described herein.

What is claimed is:

1. The combination of a tape reel hub and a device for clamping the terminal end portion of a tape within a recess defined within said tape reel hub, comprising:

first fastening means mounted upon said tape reel hub;

a base member defined upon said device;

a pair of legs extending substantially radially inwardly from said base member toward said tape reel hub;

second fastening means defined upon said pair of legs of said device for operatively engaging said first fastening means of said tape reel hub; and a bridge member connecting the radially inner ends of said pair of legs, the radial distance defined between said device base member and said bridge member being greater than the effective radial depth of said recess so as to cause circumferential expansion of said clamping device legs and said second fastening means, in response to radial contraction of said clamping device as a result of engagement between said clamping device bridge member and the radially inner portion of said hub defining said recess as said clamping device is radially inserted into said tape reel hub recess, whereby said second fastening means of said device operatively engage said first fastening means of said hub.

2. The combination as set forth in claim 1, further comprising:

at least one re-entrant portion defined within said device bridge member; and at least one projection defined within said hub recess for engaging said at least one re-entrant portion of said device bridge member.

3. The combination as set forth in claim 1, wherein:

said first fastening means of said tape reel hub extend circumferentially inwardly toward each other; and said second fastening means of said device extend circumferentially outwardly away from each other.

4. The combination as set forth in claim 3, wherein:

said base member has portions which extend circumferentially outwardly away from each other;

said base member portions are radially spaced from said second fastening means; and said first fastening means are interposed between said second fastening means and said base portions.

5. The combination as set forth in claim 1, wherein:

said base member of said device comprises a circumferential portion of said tape reel hub when said device is fully inserted within said tape reel hub recess.

6. The combination as set forth in claim 1, wherein: said legs are integral with said base member.

7. The combination as set forth in claim 1, wherein: said bridge member is integral with said pair of legs.

8. The combination as set forth in claim 1, wherein: said pair of legs, said base member, and said bridge member are integrally formed together.

* * * * *